(12) United States Patent
Gong et al.

(10) Patent No.: US 9,183,613 B2
(45) Date of Patent: Nov. 10, 2015

(54) ADAPTIVE REMOTE COMPUTING

(71) Applicant: INTEL CORPORATION, Santa Clara, CA (US)

(72) Inventors: Zhipeng Gong, Shanghai (CN); Jianyu Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/125,274

(22) PCT Filed: Aug. 1, 2013

(86) PCT No.: PCT/CN2013/080602
§ 371 (c)(1),
(2) Date: Dec. 10, 2013

(87) PCT Pub. No.: WO2015/013944
PCT Pub. Date: Feb. 5, 2015

(65) Prior Publication Data
US 2015/0154727 A1    Jun. 4, 2015

(51) Int. Cl.
*G06T 1/00*    (2006.01)
*G06T 1/20*    (2006.01)
*G06F 9/50*    (2006.01)

(52) U.S. Cl.
CPC .... *G06T 1/20* (2013.01); *G06F 9/50* (2013.01)

(58) Field of Classification Search
CPC ............... G06F 3/1454; G06F 9/4445; G06F 2209/549; G06T 2200/16
See application file for complete search history.

(56) References Cited

U.S. PATENT DOCUMENTS

| 8,196,056 | B2 | 6/2012 | Ciolfi | |
|---|---|---|---|---|
| 8,238,678 | B2 * | 8/2012 | Cheng et al. | 382/240 |
| 2003/0191860 | A1 * | 10/2003 | Gadepalli et al. | 709/247 |
| 2012/0005267 | A1 | 1/2012 | Chen et al. | |
| 2012/0218260 | A1 * | 8/2012 | Rivera et al. | 345/419 |
| 2013/0155083 | A1 | 6/2013 | McKenzie et al. | |

OTHER PUBLICATIONS

International Search Report and Written Opinion mailed May 6, 2014 for International Application No. PCT/CN2013/080602, 13 pages.

* cited by examiner

*Primary Examiner* — Hau Nguyen
(74) *Attorney, Agent, or Firm* — Schwabe, Williamson & Wyatt, P.C.

(57) ABSTRACT

Apparatuses, methods and storage medium associated with operating an application are disclosed herein. In embodiments, a method may include locally creating on a client computing device, by a client side of the application, a graphics context of the application. The graphics context may include a plurality of rendering resources associated with generating display frames of the application. The client side of the application may cause creation of a copy of the graphics context, by a remote side of the application, on a collection of remote computing resources. The client side of the application may then adaptively cause generation of a display frame locally or remotely. Other embodiments may be described and claimed.

23 Claims, 6 Drawing Sheets

ADAPTIVE REMOTE COMPUTING

CROSS REFERENCE TO RELATED APPLICATIONS

The present application is a national phase entry under 35 U.S.C. §371 of International Application No. PCT/CN2013/080602, filed Aug. 1, 2013, entitled "ADAPTIVE REMOTE COMPUTING", which designated, among the various States, the United States of America. The Specification of the PCT/CN2013/080602 Application is hereby incorporated by reference.

TECHNICAL FIELD

The present disclosure relates to the field of computing, in particular, to apparatuses, methods and storage medium associated with adaptive remote computing.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in general purpose microprocessors, networking, and related technologies have enabled further advances in remote computing. Today, many applications are operated in a computing cloud. Common cloud applications, such as cloud gaming, typically do most of the rendering on the cloud side, also referred to as the server side or the remote side. However, the response time may not always be good, especially under congested network condition.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
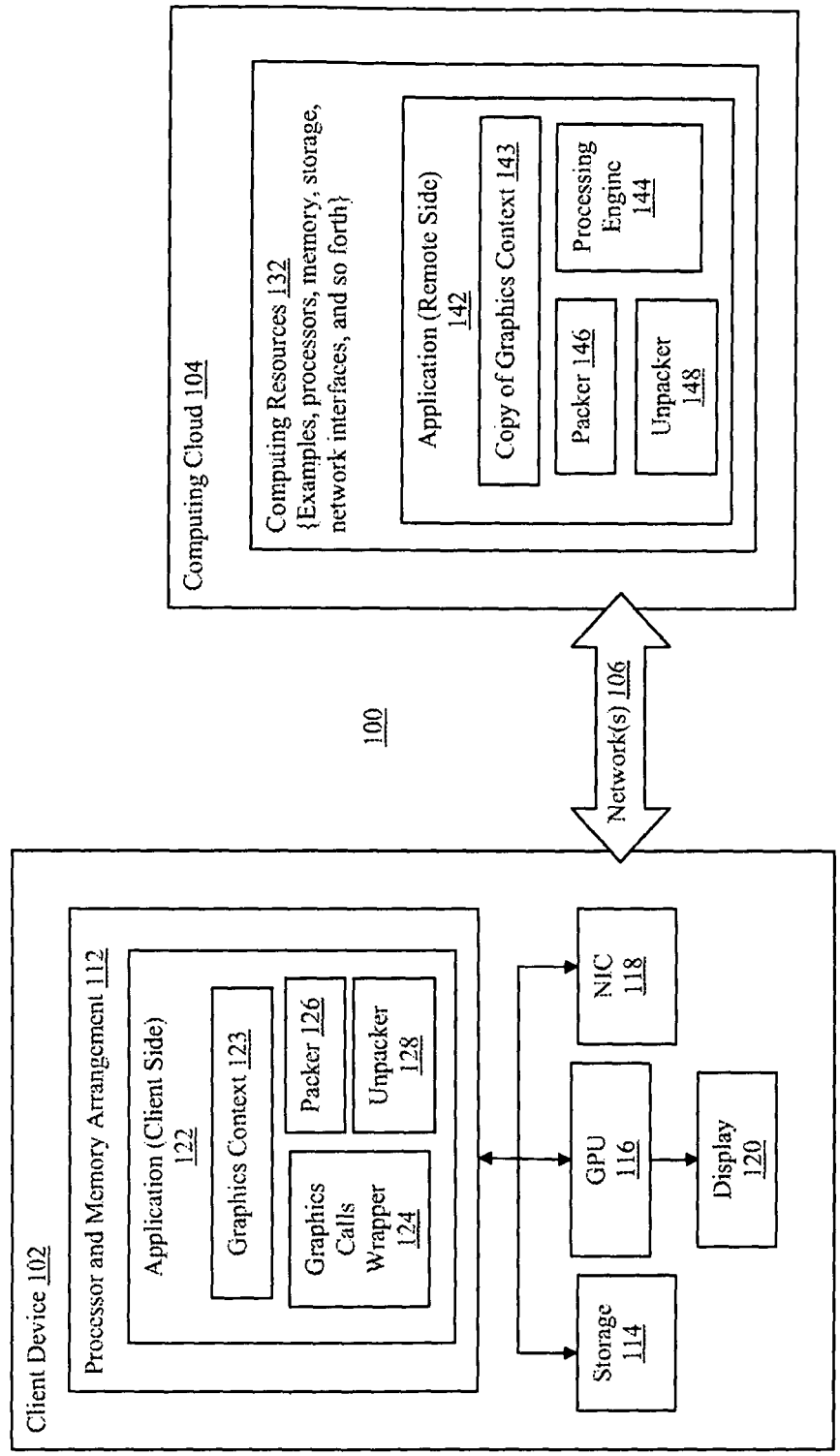
FIG. 1 illustrates an overview of an example computing arrangement incorporated with the teachings of the present disclosure for adaptive remote computing, in accordance with various embodiments.

Apparatuses, methods and storage medium associated with operating an application are disclosed herein. In embodiments, a method may include locally creating on a client computing device, by a client side of the application, a graphics context of the application. The graphics context may include a plurality of rendering resources associated with generating display frames of the application. The client side of the application may cause creation of a copy of the graphics context, by a remote side of the application, on a collection of remote computing resources. The client side of the application may then adaptively cause generation of a display frame either locally or remotely. An example of the application may be a cloud based game application, with the collection of remote computing resources being computing resources of a computing cloud.

In embodiments, the client side of the application may make the determination on whether to generate a display frame locally or remotely, at the start of a display frame as well as the end of the display frame. At the start of the display frame, the client side of the application may make the determination based at least in part on, e.g., capability of a graphics unit of the client computing device, and/or bandwidth of a network coupling the client computing device and the collection of remote computing resources. At the end of the display frame, a wrapper of the client side of the application configured to package and send the graphics calls to cause the display frame to be generated remotely, may re-determine whether the display frame is indeed to be generated remotely or change to local generation. The re-determination may be further based on, e.g., complexity of the display frame.

In embodiments, an apparatus, e.g., a smartphone or a computing tablet, may include one or more processors, and storage medium having the client side of the application configured to cause the apparatus, in response to operation by the one or more processors, to perform any the above described methods and their variants. In embodiments, at least one storage medium may include instructions configured to cause an apparatus, in response to execution by the apparatus, to perform any the above described methods and their variants.

In the detailed description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality. The term "closed captions" is to include traditional closed captions and/or subtitles.

Referring now FIG. 1, an overview of an example computing arrangement incorporated with the teachings of the present disclosure for adaptive remote computing, in accordance with various embodiments, is shown. As illustrated, in embodiments, computing arrangement 100 may include client computing device 102 and computing cloud 104, coupled with each other via network 106. Client computing device 102 may include processor and memory arrangement 112, and various peripheral devices, such as storage 114, graphics processing unit (GPU) 116, networking interface (NIC) 118 and display unit 120, coupled with each other, as shown. Processor and memory arrangement 112 may be configured to host and execute operating system and services and applications, such as client side 122 of an application, which may have a remote side 142 of the application. In embodiments, remote side 142 of the application may be operating on some computing resources 132 of a computing cloud 104. In embodiments, client side 122 and remote side 124 of the application may be configured with teachings of the present disclosure to enable display frames of the application to be adaptively generated on either client computing device 102 or computing cloud 104. As a result, user experience of the application may potentially be enhanced. These and other aspects will be further described below with additional references to FIGS. 2-6.

Still referring to FIG. 1 for now, in embodiments, client side 122 of the application may be configured to determine whether a display frame is to be generated locally on computing device 102, e.g., using GPU 116, or remotely, e.g., using computing resources 132 of computing cloud 104. Client side 122 of the application may be configured to make the local or remote generation determination at a start of a display frame, as well as at an end of the display frame. At each determination, client side 122 of the application may consider one or more factors including, but are not limited to, e.g., bandwidth of network 106, capability of GPU 116 and/or complexity of the display frame.

In embodiments, client side 122 of the application may be configured to create and maintain, on client computing device 102, graphics context 123 that includes a number of rendering resources associated with generation of display frames. Examples of rendering resources may include, but are not limited to, textures, index buffers, vertex buffers, instance buffers or shaders. Further, client side 122 of the application may be configured to cause a copy of the graphics context 143 to be created and maintained, e.g., through remote side 142 of the application, on computing resources 132 of computing cloud 104. In other words, each time client side 122 of the application creates or updates a rendering resource of graphics context 123 on client computing device 102, e.g., create a texture or a buffer, client side 122 of the application may also request the remote side 142 of the application to create or update the rendering resource in the copy of the graphics context 143 on computing cloud 104, e.g., creation of the same texture or buffer. In embodiments, client side 122 of the application may further cause identifiers to be assigned to the rendering resources, e.g., texture_A, texture_B, buffer_A, buffer_B, and so forth.

Figure 2:
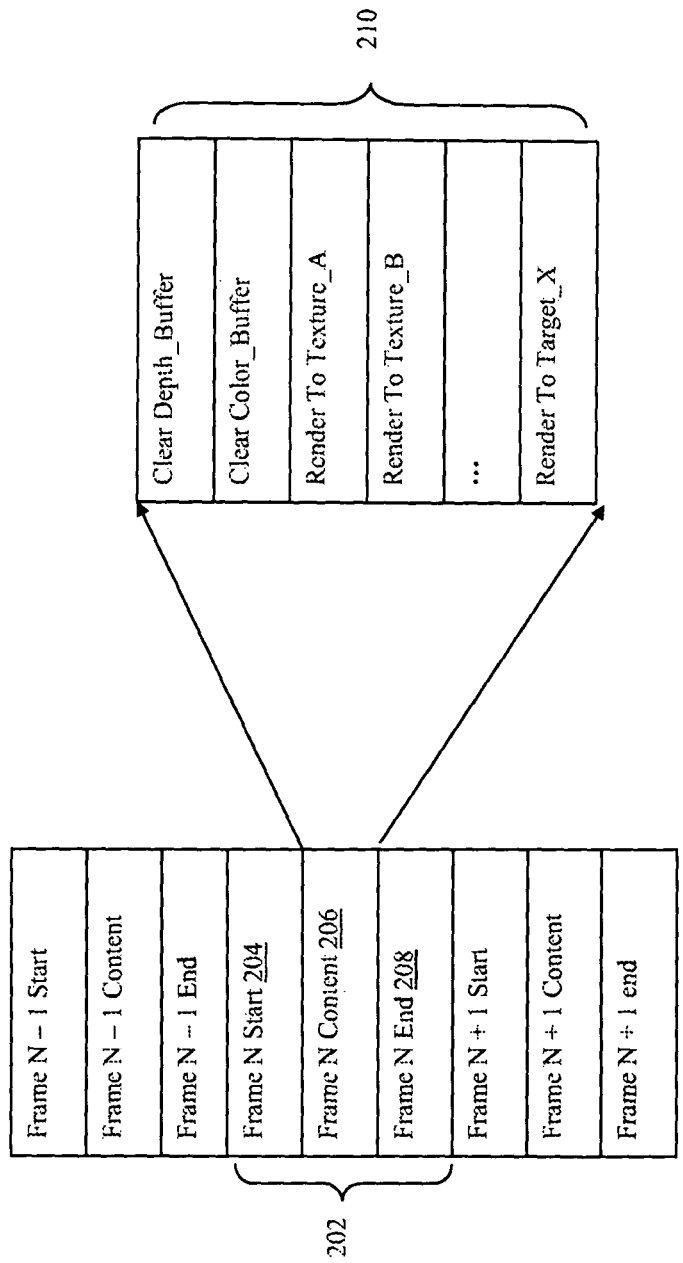
FIG. 2 illustrates display frames and graphics calls in association with generation of a display frame, in accordance with various embodiments.

Referring now also to FIG. 2, wherein display frames and graphics calls in association with generation of a display frame, in accordance with various embodiments, are illustrated. As shown, each display frame 202 may include a frame content portion 206 bounded by a frame start marker 204 and a frame end marker 208. Each frame content portion 206 may include a number of graphics calls 210. Various ones of the graphics calls, such as, but not limited to, graphics calls to generate textures and/or shades, and may have associated data. Some of these associated data may be of substantial quantity. Examples of graphics calls, in addition to calls to generate textures and/or shades, may include, but are not limited to, calls to update or clear a buffer, render onto a target, and so forth.

In embodiments, as illustrated in FIG. 1, client side 122 of the application may include graphics calls wrapper 124, packer 126 and unpacker 128. Whereas, remote side 142 of the application may include processing engine 144, packer 146 and unpacker 148. Graphics calls wrapper 124 (or hereinafter, simply "wrapper") may be configured to intercept the graphics calls and associated data in association with generation of display frames. In embodiments, wrapper 124 may be configured to intercept graphics calls and associated data in association with generating a display frame, in response to a determination, e.g., at the start of the display frame, to generate the display frame remotely. On interception, wrapper 124 may be configured to save the graphics calls and the associated data into, e.g., storage 114. Further, wrapper 124 may be configured to amend the subsequent (non-rendering resource creation) graphics calls to reference the rendering resources by their identifiers, thereby potentially reducing the bandwidth requirement to transmit the graphics calls (without the associated data) to remote side 142 of the application to process, and generate the display frame. In processing the graphics calls, remote side 144 of the application would operate on the remote copies of the rendering resources referenced by the identifiers.

In embodiments, packer 126 of client side 122 may be configured to encode and/or compress the graphics calls (and their associated data, if included, in selected situations) to be sent to remote side 142 of the application, to potentially further reduce the bandwidth required of network 106 to transmit the graphics calls to remote side 142 of the application. Unpacker 148 of remote side 142 may be configured to decode and/or decompress the packed graphics calls (and their associated data, if included) for processing engine 144. Processing engine 144 may be configured to process the graphics calls to generate the display frames, operating on the remote copies of the rendering resources referenced by the identifiers, as earlier described.

Packer 146 of remote side 142 may be configured to encode and/or compress the display frames generated on computing cloud 104, to prepare them for transmission to client computing device 102, to potentially reduce the bandwidth required of network 106 to transmit the display frames to client side 122 of the application. Unpacker 128 of client side 122 may be configured to decode and/or decompress the display frames to recover the display frames. Further, unpacker 128 may be configured to forward the recovered display frames to a renderer (not shown) of client computing device 102 to render the display frames on, e.g., display unit 120

Still referring to FIG. 1, processor and memory arrangement 102 is intended to represent a broad range of processors and memory devices, including without limitations, arrangements designed for mobile computing. For examples, without limitations, processor may be any one of a number of single or multi-core general or special purpose processors known in the art. Memory may be any one of a number of volatile and/or non-volatile storage known in the art including, but are not limited to, dynamic random access memory (DRAM), FLASH, and so forth. Similarly, one or more memory units may be used. Further, the memory may include one or more levels of caches.

Storage 114 may be any one of a number of volatile or non-volatile persistent storage. Examples of volatile storage may include static random access memory (SRAM), dynamic random access memory (DRAM), and so forth. Non-volatile persistent storage may be any one of a number of magnetic, optical, and/or solid state storage known in the art. One or more storage units may be included. For the purpose of this application, the terms "memory" and "storage" may be considered interchangeable, unless the context clearly indicates otherwise. Likewise, GPU 116 may be any one of a wide range of graphics processors known in the art. NIC 118 may be any one of a wide range of wired and/or wireless communication interfaces configured to couple processor and memory arrangement 102 to a personal, local and/or wide area network. An example of wired communication interfaces may include an Ethernet networking interface. Examples of wireless communication interfaces may include interfaces that support WiFi, 3G/4G wireless communications. Local and/or wide area networks may include private and/or public networks, e.g., the Internet. Display unit 120 may be any one of a number of display devices known in the art including, but are not limited to, touch screen displays, which may also serve as an input device.

In embodiments, client computing device 102 may include other components, such as other input and output devices. Input devices may include keyboard or other cursor control and/or gesture recognition devices. Still further, client computing device 102 may include Global Position System (GPS) support, cameras, and sensors of various types.

In embodiments, processor and memory arrangement 102 and the various peripheral devices may be co-located on the same platform and coupled with each other with couplings, such as, a system bus. That is, processor and memory arrangement 102 alone, or in conjunction with the various peripheral devices, may form a single computing device, such as a smartphone, a computing tablet, an ultrabook, a laptop, a desktop, a server, a set-top box, a game console, a media player, an e-reader, and so forth. In other embodiments, processor and memory arrangement 102 and some or all of the peripheral devices may be remotely located from each other, and coupled with each other with a coupling, such as, a communication link, via a wired and/or wireless, personal, local area and/or wide area networks.

On the remote side, computing cloud 104 is intended to represent a broad range of cloud computing service models including, but are not limited to, infrastructure as a service (IaaS), platform as a service (PaaS), and/or software as a service (SaaS). Computing resources 132 may include any number of processor, memory, storage, networking, and other resources. Similar to client computing device 102, these processor, memory, storage, networking . . . resources are intended to represent a broad range of such resources known in the art, with capacity and performance characteristics suitable for use to constitute the computing cloud 104.

Before proceeding to further describe the adaptive remote computing of the present disclosure, it should be noted, for the purpose of the present application, the terms cloud computing and remote computing may be considered synonymous. The collection of cloud computing resources may be referred to as a collection of remote computing resources.

Likewise, remote side 142 of the application may also be referred to as server side of the application.

Figure 3:
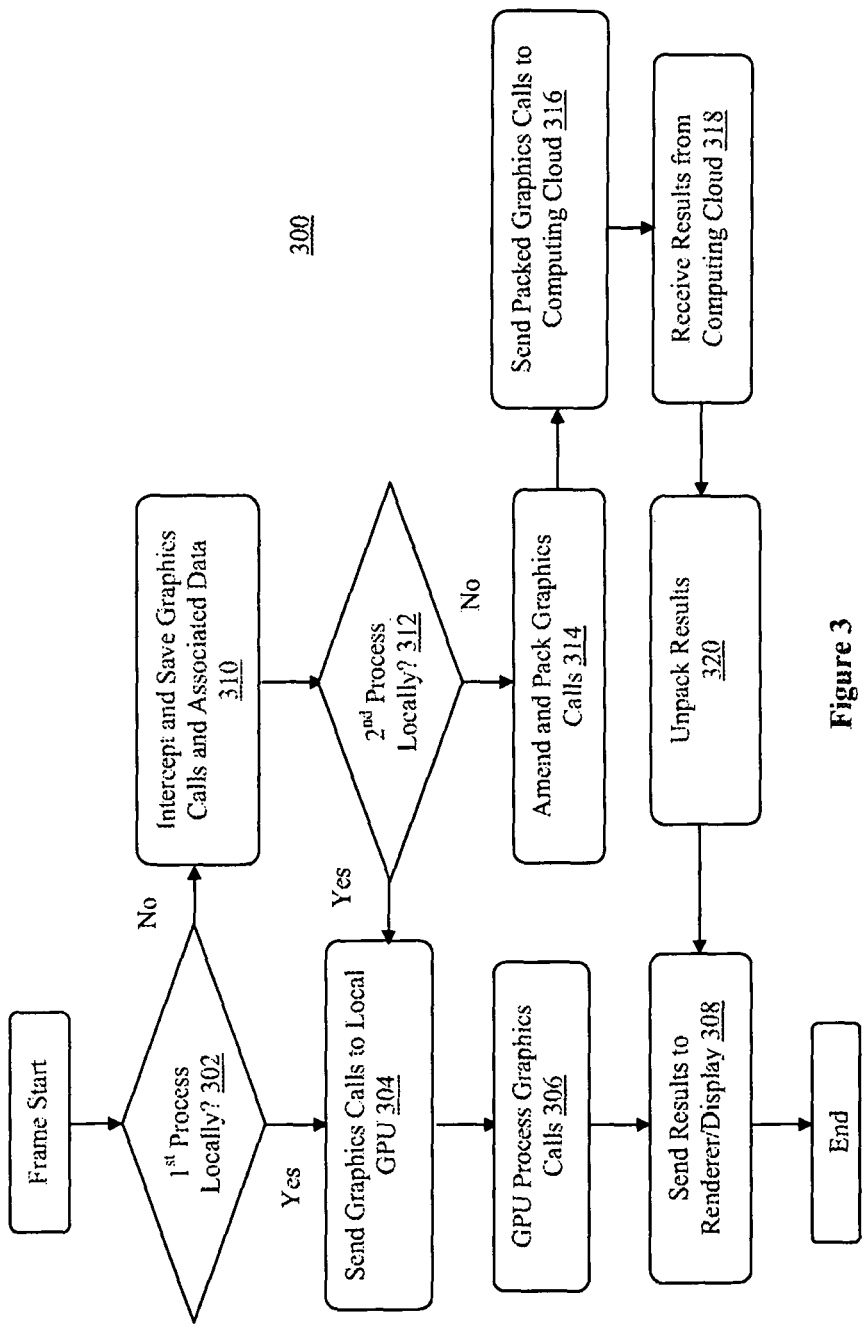
FIG. 3 illustrates a client side process for adaptive remote computing, in accordance with various embodiments.

Referring now FIG. 3, wherein a client side process for adaptive remote computing, in accordance with various embodiments, is illustrated. Process 300 may be performed, e.g., by the various elements of client side 122 of the application. As shown, process 300 may begin at block 302, where at the start of a display frame, a first determination may be made as to whether to generate the display frame locally or remotely. The first determination may be made, e.g., by client side 122 of the application. As described earlier, the first determination may be made taking into consideration the capability of GPU 116, bandwidth of network 106, and/or complexity of the display frame. From block 302, process 300 may proceed to block 304, if a result of the first determination is to generate the display frame locally. At block 304, graphics calls and the associated data in association with generating the display may be routed, e.g., by client side 122 of the application, to a local graphics unit, e.g., GPU 116, for processing. From block 304, process 300 may proceed to block 306. At block 306, the graphics calls may be processed to generate the display frame, e.g., by GPU 116. From block 306, process 300 may proceed to block 308. At block 308, the generated display frame may be routed to a renderer to render the display frame, e.g., on display unit 120.

Back at block 302, process 300 may proceed to block 310 instead, if a result of the first determination, at the start of the display frame, is to generate the display frame remotely. At block 310, the graphics calls and the associated data may be intercepted, e.g., by wrapper 124. At block 310, the intercepted graphics calls and the associated data may also be saved, e.g., into storage 114. From block 310, process 300 may proceed to block 312. At block 312, another (second) determination may be made, at the end of the display frame, on whether the display frame is to be generated locally or remotely, e.g., by wrapper 124. As described earlier for the first determination, the second determination may likewise be made taking into consideration the capability of GPU 116, bandwidth of network 106, and in particular, complexity of the display frame. On determination that the display frame should be generated locally, process 300 may proceed to block 304 and continue there from as earlier described. In other words, in embodiments, an earlier first determination to generate the display frame remotely, at the start of the display frame, may still nonetheless be changed at the end of the display frame, and have the display frame generated locally. An earlier first determination, at the start of a display frame, to generate the display frame remotely, is re-affirmed by a second determination, at the end of the display frame, before the display frame is caused to be generated remotely. Repeated determinations may provide enhanced adaptive operation of the application, and in turn, may provide enhanced user experience.

On the other hand, in response to a result to continue with the earlier first determination to generate the display remotely, process 300 may proceed to block 314. At block 314, the graphics calls may be packed for transmission to the remote side 142 of the application, e.g., by packer 126. Further, as earlier described, prior to packing, the graphics calls may be amended to reference the rendering resources by their identifier, thereby removing the need to transmit the associated data of the graphics calls, and reducing the bandwidth requirement on network 106 for the transmission.

From block 314, process 300 may proceed to block 316. At block 316, the packed graphic calls may be transmitted to the remote side 142 of the application, e.g., by packer 126. From block 316, process 300 may proceed to block 318. At block 318, the display frame may be received from the remote side 142 of the application. In embodiments, to reduce the bandwidth requirements on network 106, the display frame may be received in a packed form. Thus, from block 318, process 300 may proceed to block 320. At block 320, the packed display frame may be unpacked and recovered, e.g., by unpacker 128. On unpacking, process 300 may proceed to block 308, and continue therefrom as earlier described.

Figure 4:
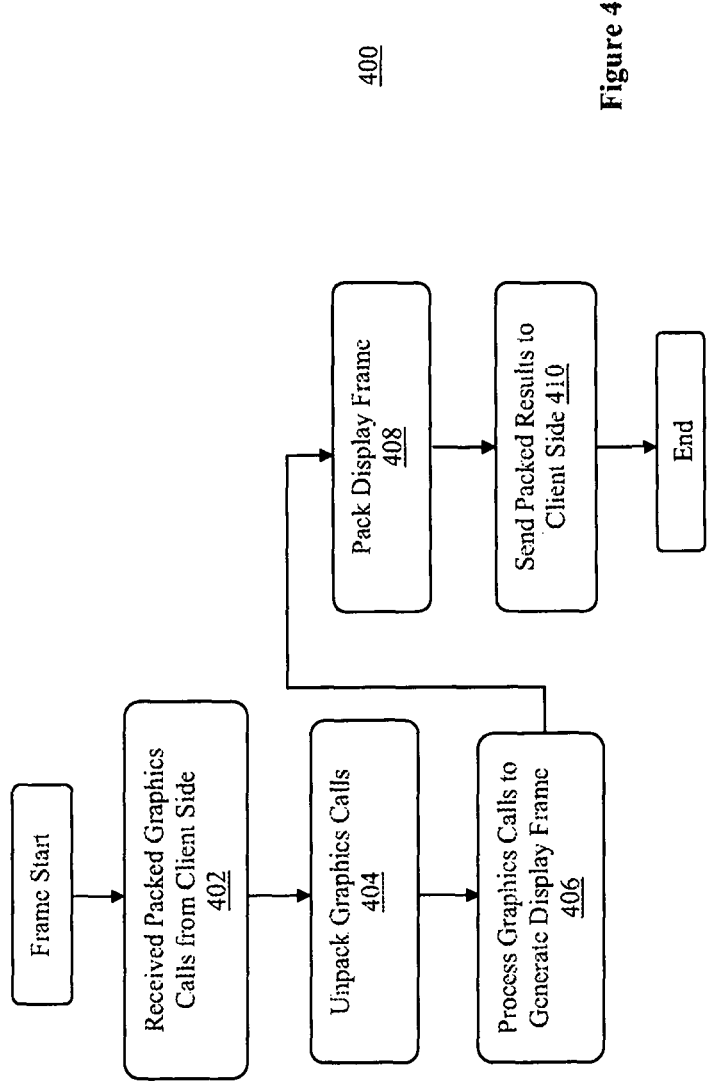
FIG. 4 illustrates a remote side process for adaptive remote computing, in accordance with various embodiments.

Referring now to FIG. 4, wherein a remote side process for adaptive remote computing, in accordance with various embodiments, is shown. Process 400 may be performed, e.g., by remote side 142 of the application. As shown, in embodiments, process 400 may begin at block 402. At block 402, packed graphics calls may be received from client side 122 of the application. From block 402, process 400 may proceed to block 404. At block 404, the packed graphic calls may be unpacked, e.g., by unpacker 148. Upon unpacking, process 400 may proceed to block 406. At block 406, the graphics calls may be processed to generate the display frame, e.g., by processing engine 148. Upon generation, process 400 may proceed to block 408. At block 408, the display frame may be packed for transmission to client side 122 of the application, e.g., by packer 144, to potentially reduce bandwidth requirement of the network, e.g., network 106. Upon packing, process 400 may proceed to block 410. At block 410, the packed display frame may be transmitted to client side 122 of the application for unpacking and rendering. The transmission may, e.g., be performed by packer 144.

Figure 5:
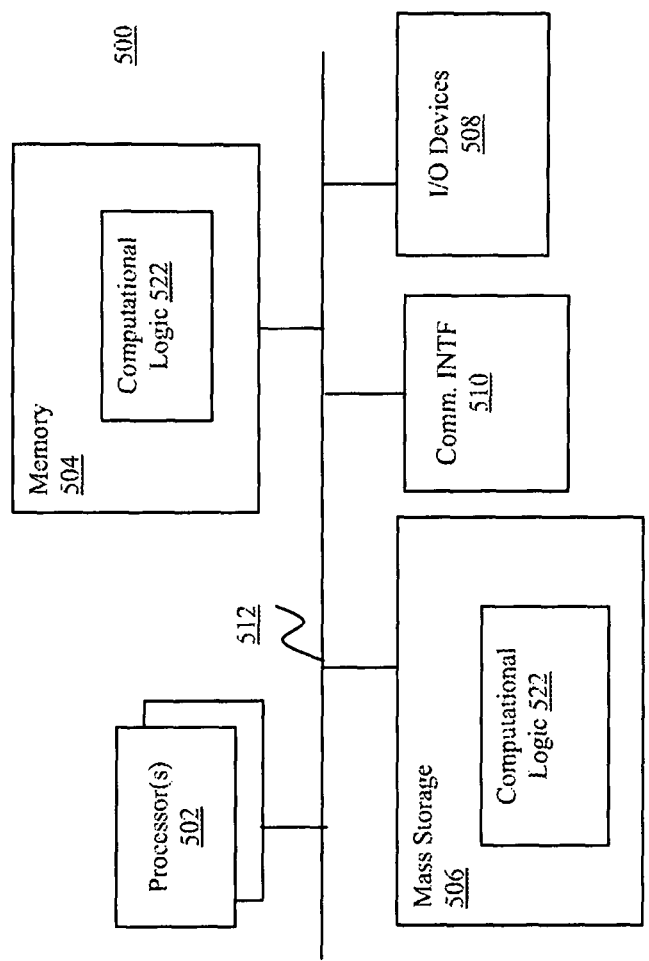
FIG. 5 illustrates an example computing environment suitable for practicing the present disclosure, in accordance with various embodiments.

Referring now to FIG. 5, wherein an example computer suitable for use for the arrangement of FIG. 1, in accordance with various embodiments, is illustrated. As shown, computer 500 may include one or more processors or processor cores 502, and system memory 504. For the purpose of this application, including the claims, the terms "processor" and "processor cores" may be considered synonymous, unless the context clearly requires otherwise. Additionally, computer 500 may include mass storage devices 506 (such as diskette, hard drive, compact disc read only memory (CD-ROM) and so forth), input/output devices 508 (such as display, keyboard, cursor control and so forth) and communication interfaces 510 (such as network interface cards, modems and so forth). The elements may be coupled to each other via system bus 512, which may represent one or more buses. In the case of multiple buses, they may be bridged by one or more bus bridges (not shown).

Each of these elements may perform its conventional functions known in the art. In particular, system memory 504 and mass storage devices 506 may be employed to store a working copy and a permanent copy of the programming instructions implementing the operations associated with client side 122 or remote side 142 of the application of FIG. 1, earlier described, collectively denoted as computational logic 522. The various elements may be implemented by assembler instructions supported by processor(s) 502 or high-level languages, such as, for example, C, that can be compiled into such instructions.

The permanent copy of the programming instructions may be placed into permanent storage devices 506 in the factory, or in the field, through, for example, a distribution medium (not shown), such as a compact disc (CD), or through communication interface 510 (from a distribution server (not shown)). That is, one or more distribution media having an implementation of the agent program may be employed to distribute the agent and program various computing devices.

The number, capability and/or capacity of these elements 510-512 may vary, depending on the intended use of example computer 500, e.g., whether example computer 500 is a stationary computing device like a set-top box or a desktop computer, or a mobile computing device, like a smartphone, tablet, ultabook or laptop. The constitutions of these elements 510-512 are otherwise known, and accordingly will not be further described.

Figure 6:
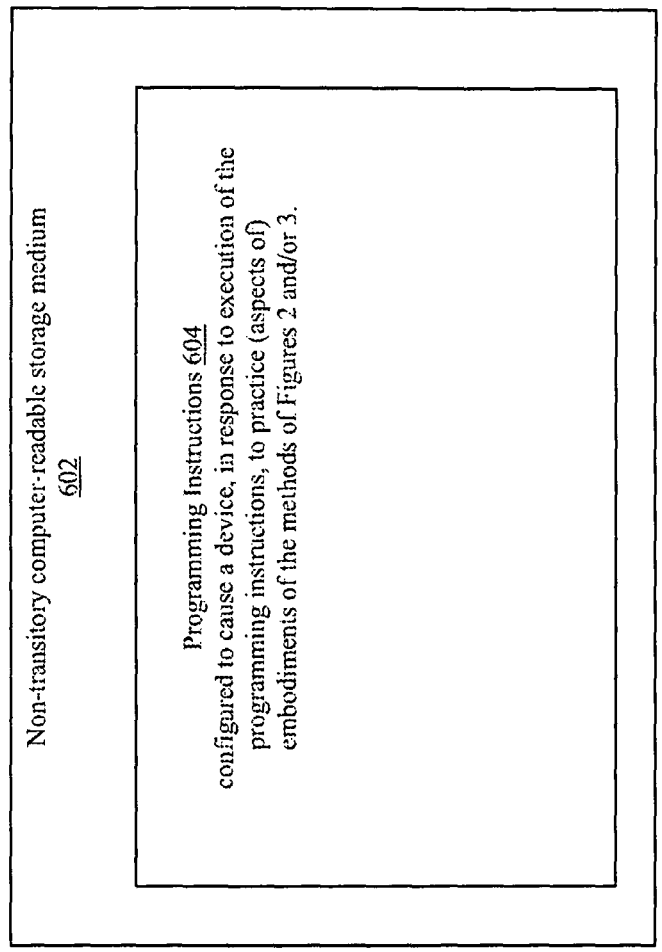
FIG. 6 illustrates an example storage medium with instructions configured to enable an apparatus to practice various aspects of the present disclosure, in accordance with various embodiments.

FIG. 6 illustrates an example computer-readable non-transitory storage medium having instructions configured to practice all or selected ones of the operations associated with client side 122 and/or remote side 142 of the application of FIG. 1, earlier described; in accordance with various embodiments. As illustrated, non-transitory computer-readable storage medium 602 may include a number of programming instructions 604. Programming instructions 604 may be configured to enable a device, e.g., computer 500, in response to execution of the programming instructions, to perform, e.g., various operations of processes 300 and/or 400 of FIGS. 3 and/or 4. In alternate embodiments, programming instructions 604 may be disposed on multiple non-transitory computer-readable storage media 602 instead. In still other embodiments, programming instructions 604 may be disposed in a computer-readable transitory storage medium, such as a signal.

Referring back to FIG. 5, for one embodiment, at least one of processors 502 may be packaged together with computational logic 522 (in lieu of storing in memory 504 and/or mass storage 506) configured to practice aspects of the process(es) of FIGS. 3 and/or 4. For one embodiment, at least one of processors 502 may be packaged together with computational logic 522 configured to practice aspects of the process(es) of FIG. 3 and/or 4 to form a System in Package (SiP). For one embodiment, at least one of processors 502 may be integrated on the same die with computational logic 522 configured to practice aspects of the process(es) of FIGS. 3 and/or 4. For one embodiment, at least one of processors 502 may be packaged together with computational logic 522 configured to practice aspects of the process(es) of FIGS. 3 and/or 4 to form a System on Chip (SoC). For at least one embodiment, the SoC may be utilized in, e.g., but not limited to, a computing tablet.

Thus, example embodiments described include, but are not limited to:

Example 1 may be a method for operating an application. The method may include locally creating on a client computing device, by a client side of the application operating on the client computing device, a graphics context of the application, wherein the graphics context includes a plurality of rendering resources associated with generating display frames of the application; and causing, by the client side of the application, creation of a copy of the graphics context, by a remote side of the application, on a collection of remote computing resources. The method may further include adaptively causing, by the client side of the application, generation of a display frame locally, using a graphics unit of the client computing device and the local graphics context, or remotely, using the collection of remote computing resources, the remote copy of the graphics context, and a remote side of the application.

Example 2 may be the method of example 1, wherein the plurality of rendering resources comprise one or more textures, index buffers, vertex buffers, instance buffers or shaders; and wherein the graphics calls comprise one or more calls to generate a texture, update a buffer, or generate a shade.

Example 3 may be the method of example 1 or 2, wherein adaptively causing a display frame to be generated locally or remotely comprises determining, at a start of the display frame, by the client side of the application, whether to generate the display frame locally or remotely.

Example 4 may be the method of example 3, wherein determining is based at least in part on capability of the graphics unit and availability of bandwidth of a network coupling the client computing device and the collection of remote computing resources.

Example 5 may be the method of example 3, further comprising in response to a determination, at the start of the display frame, to locally generate the display frame, routing, by the client side of the application, graphics calls and associated data in association with generation of the display frame to the graphics unit of the client computing device.

Example 6 may be the method of example 3, further comprising in response to a determination, at the start of the display frame, to remotely generate the display frame, intercepting graphic calls and associated data in association with generating the display frame, by a wrapper of the client side of the application; and saving into a storage of the client computing device, by the wrapper, the graphics calls and associated data.

Example 7 may be the method of example 6, further comprising on collection of the graphics calls and associated data, re-determining, at an end of the display frame, by the wrapper, whether to generate the display frame locally or remotely.

Example 8 may be the method of example 7, wherein re-determining is based at least in part on complexity of the display frame, in view of the intercepted graphics calls.

Example 9 may be the method of example 7, further comprising in response to a determination to remotely generate the display frame, packing, by a packer of the client side of the application, at least the graphics calls, and transmitting, by the packer, the packed at least graphics calls to the remote side of the application to be unpacked, processed, and have the display frame generated.

Example 10 may be the method of example 9, wherein causing a copy of the graphics context to be created remotely comprises assigning, by the client side of the application, identifiers to the rendering resource; and the method further comprises amending, by the wrapper, prior to packing, non-rendering resource creation ones of the graphics calls to selectively reference the remote copies of the rendering resources using the identifiers.

Example 11 may be the method of example 9, further comprising receiving, by an unpacker of the client side of the application, from the remote side of the application, the display frame in a packed form, after the display frame has been generated and packed by the remote side of the application; unpacking, by the unpacker, the packed display frame to recover the display frame, after receiving the packed display frame; and sending the recovered display frame, by the unpacker, to a renderer of the client computing device to render the display frame on a display unit of the client computing device.

Example 12 may be an apparatus for operating an application. The apparatus may include one or more processors; and a graphics unit coupled with the one or more processors; and a networking interface coupled with the one or more processors, and configured to couple the apparatus, through a network, to a collection of remote computing resources. The apparatus may also include a client side of an application configured to be operated by the one or more processors, wherein the client side of the application is configured to locally create a graphics context of the application on the apparatus, wherein the graphics context includes a plurality of rendering resources associated with generation of display frames of the application; cause creation of a copy of the graphics context, by a remote side of the application, on the collection of remote computing resources; and adaptively cause generation of a display frame of the application locally, through usage the graphics unit and the local graphics context, or remotely, through usage of the collection of remote computing resources, the remote copy of the graphics context, and the remote side of the application.

Example 13 may be the apparatus of example 12, wherein the client side of the application is configured to determine, at a start of the display frame, whether to generate the display frame locally or remotely.

Example 14 may be the apparatus of example 13, wherein the client side of the application is configured to determine based at least in part on capability of the graphics unit and availability of bandwidth of the network.

Example 15 may be the apparatus of example 13, wherein the client side of the application is further configured, in response to a determination, at the start of the display frame, to locally generate the display frame, to route graphics calls and associated data in association with generation of the display frame to the graphics unit.

Example 16 may be the apparatus of any one of claims 13-15, wherein the apparatus further comprises a storage; and wherein the client side of the application comprises a wrapper configured, in response to a determination, at the start of the display frame, to remotely generate the display frame, to intercept graphic calls and associated data in association with generation of the display frame, and save the graphics calls and associated data into the storage.

Example 17 may be the apparatus of 16, wherein the wrapper is further configured, on collection of the graphics calls and associated data, to re-determine, at an end of the display frame, whether to generate the display frame locally or remotely.

Example 18 may be the apparatus of 17, wherein the wrapper is configured to re-determine based at least in part on complexity of the display frame, in view of the intercepted graphics calls.

Example 19 may be the apparatus of 17, wherein the client side of the application further comprise a packer configured, in response to a determination to remotely generate the display frame, to pack at least the graphics calls, and transmit the packed at least graphics calls to the remote side of the application to be unpacked, processed, and have the display frame generated.

Example 20 may be the apparatus of 19, wherein the client side of the application is configured to assign identifiers to the rendering resource; and the wrapper is further configured to amend non-rendering resource creation ones of the graphics calls to selectively reference the remote copies of the rendering resources through usage of the identifiers.

Example 21 may be the apparatus of 19, wherein the apparatus further comprises a display unit, and a renderer coupled to the display unit. The apparatus may further include the client side of the application, which may include an unpacker configured to receive from the remote side of the application, the display frame in a packed form, after the display frame has been generated and packed by the remote side of the application; and unpack the packed display frame to recover the display frame, after receipt the packed display frame. The unpacker may be further configured to send the recovered display frame to the renderer to render the display frame on the display unit.

Example 22 may be the apparatus of any one of examples 13-21, wherein the apparatus is a selected one of a set-top box, a smartphone, a computing tablet, an ultrabook, a laptop computer, a desktop computer, a server computer, a game console, or a media player.

Example 23 may be include at least one storage medium comprising a plurality of instructions configured to cause an apparatus, in response to execution of the instructions by the apparatus, to perform any one of the methods of claims 1-12.

Example 24 may be an apparatus comprising means for performing any one of the methods of claims 1-12.

Example 25 may be a method for operating an application. The method may include creating on a collection of computing resources remote to a client computing device, by a remote side of the application operating on the collection of computing resources, copies of a graphics context of the application, corresponding to the graphics context created by a client side of the application on the client computing device, wherein the graphics context include a plurality of rendering resources associated with generation of display frames of the application. The method may include receiving, by the remote side of the application, from the client side of the application, at least packed graphics calls in association with generation of a plurality, but not all, of display frames of the application, wherein receiving comprises receiving the plurality of the display frames at an end of processing of the display frames by the client computing device, after the client computing device reaffirmed an earlier determination to generate the plurality of display frames remotely on the collection of computing resource. The method may also further include unpacking and processing, by the remote side of the application, the graphics calls to generate the plurality of display frames; and packing and sending, by the remote side of the application, the plurality of display frames to the client side of the application for unpacking, and rendering onto a display unit of the client computing device.

Example 26 may be an apparatus for operating an application. The apparatus may comprise: one or more processors; and a networking interface coupled with the one or more processors, and configured to couple the apparatus, as a member of a collection of remote computing resources, to a client computing device, through a network. The apparatus may further include a remote side of an application configured to be operated by the one or more processors, wherein the remote side of the application is configured to create copies of a graphics context of the application, created by a client side of the application on the client computing device, wherein the graphics context include a plurality of rendering resources associated with generation of display frames of the application. The remote side of the application may be configured to receive from the client side of the application, packed graphics calls in association with generation of a plurality, but not all, of display frames of the application, wherein receive comprises receive the plurality of the display frames at an end of processing of the display frames by the client computing device, after the client computing device reaffirms an earlier determination to generate the plurality of display frames remotely on the collection of computing resource. The remote side of the application may be further configured to unpack and process the graphics calls to generate the plurality of display frames; pack and send the plurality of display frames to the client side of the application for unpacking, and rendering onto a display unit of the client computing device.

Example 27 may be at least one storage medium comprising a plurality of instructions configured to cause an apparatus, in response to execution of the instructions by the apparatus, to perform the method of claim 25.

Example 28 may be an apparatus comprising means for performing the method of claim 25.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for operating an application, the apparatus comprising
    one or more processors;
    a graphics unit coupled with the one or more processors;
    a networking interface, coupled with the one or more processors, to couple the apparatus, through a network, to a collection of remote computing resources; and
    a client side of an application to be operated by the one or more processors to:
    locally create a graphics context of the application on the apparatus, wherein the graphics context includes a plurality of rendering resources associated with generation of display frames of the application, wherein the rendering resources have corresponding assigned identifiers;
    cause creation of a copy of the graphics context, by a remote side of the application, on the collection of remote computing resources; and
    adaptively cause generation of a display frame of the application locally, through usage the graphics unit and the local graphics context, or remotely, through usage of the collection of remote computing resources, the remote copy of the graphics context, and the remote side of the application;
    wherein the client side of the application comprises a wrapper; and
    wherein to adaptively cause generation of a display frame remotely includes interception of graphic calls and associated data in association with generation of the display frame, by the wrapper, and amendment of non-rendering resource creation ones of the graphics calls to selectively reference the remote copies of the rendering resources, by the wrapper, through usage of the identifiers.

2. The apparatus of claim 1, wherein the client side of the application is to determine, at a start of the display frame, whether to generate the display frame locally or remotely.

3. The apparatus of claim 2, wherein the client side of the application is to determine based at least in part on capability of the graphics unit and availability of bandwidth of the network.

4. The apparatus of claim 2, wherein the client side of the application is to route graphics calls and associated data in association with generation of the display frame to the graphics unit, in response to a determination, at the start of the display frame, to locally generate the display frame.

5. The apparatus of claim 2, wherein the apparatus further comprises a storage; and, and the wrapper is to save intercepted graphics calls and associated data into the storage, in response to a determination, at the start of the display frame, to remotely generate the display frame.

6. The apparatus of claim 5, wherein the wrapper is to re-determine, at an end of the display frame, whether to generate the display frame locally or remotely, on collection of the graphics calls and associated data.

7. The apparatus of claim 6, wherein the wrapper is to perform the re-determination, based at least in part on complexity of the display frame, in view of the intercepted graphics calls.

8. The apparatus of claim 6, wherein the client side of the application further comprise a packer to pack at least the graphics calls, and transmit the packed at least graphics calls to the remote side of the application, in response to a determination to remotely generate the display frame, for the remote side of the application to unpack, process, and have the display frame generated.

9. The apparatus of claim 8, wherein the apparatus further comprises a display unit, and a renderer coupled to the display unit, and wherein the client side of the application further comprises an unpacker to
receive from the remote side of the application, the display frame in a packed form, after the display frame has been generated and packed by the remote side of the application;
unpack the packed display frame to recover the display frame, after receipt the packed display frame; and
send the recovered display frame to the renderer to render the display frame on the display unit.

10. The apparatus of claim 1, wherein the apparatus is a selected one of a set-top box, a smartphone, a computing tablet, an ultrabook, a laptop computer, a desktop computer, a server computer, a game console, or a media player.

11. One or more non-transitory computer-readable storage medium having instructions, in response to execution of the instructions by the client computing device, to cause a client computing device to provide a client side of an application to:
locally create on the client computing device, a graphics context of the application, wherein the graphics context includes a plurality of rendering resources associated with generating display frames of the application, wherein the rendering resources have corresponding assigned identifiers;
cause creation of a copy of the graphics context, by a remote side of the application, on a collection of remote computing resources; and
adaptively cause generation of a display frame locally, using a graphics unit of the client computing device and the local graphics context, or remotely, using the collection of remote computing resources, the remote copy of the graphics context, and a remote side of the application;
wherein the client side of the application is to include a wrapper; and
wherein to adaptively cause generation of a display frame remotely includes interception of graphic calls and associated data in association with generation of the display frame, by the wrapper, and amendment of non-rendering resource creation ones of the graphics calls to selectively reference the remote copies of the rendering resources, by the wrapper, through usage of the identifiers.

12. The storage medium of claim 11, wherein the plurality of rendering resources comprise one or more textures, index buffers, vertex buffers, instance buffers or shaders; and wherein the graphics calls comprise one or more calls to generate a texture, update a buffer, or generate a shade.

13. The storage medium of claim 11, wherein adaptively cause a display frame to be generated locally or remotely comprises determine, at a start of the display frame, whether to generate the display frame locally or remotely.

14. The storage medium of claim 13, wherein determine is based at least in part on capability of the graphics unit and availability of bandwidth of a network coupling the client computing device and the collection of remote computing resources.

15. The storage medium of claim 13, the client side of the application to further, in response to a determination, at the start of the display frame, to locally generate the display frame, route graphics calls and associated data in association with generation of the display frame to the graphics unit of the client computing device.

16. The storage medium of claim 13, the client side of the application to further, on collection of the graphics calls and associated data, re-determine, at an end of the display frame, using the wrapper, whether to generate the display frame locally or remotely.

17. The storage medium of claim 16, wherein re-determine is based at least in part on complexity of the display frame, in view of the intercepted graphics calls.

18. The storage medium of claim 16, the client side of the application to further, in response to a determination to remotely generate the display frame, pack, using a packer of the client side of the application, at least the graphics calls, and transmit, using the packer, the packed at least graphics calls to the remote side of the application to be unpacked, processed, and have the display frame generated.

19. The storage medium of claim 18, the client side of the application to further:
receive, using an unpacker of the client side of the application, from the remote side of the application, the display frame in a packed form, after the display frame has been generated and packed by the remote side of the application;
unpack, using the unpacker, the packed display frame to recover the display frame, after receiving the packed display frame; and
send the recovered display frame, using the unpacker, to a renderer of the client computing device to render the display frame on a display unit of the client computing device.

20. An apparatus for operating an application, comprising:
one or more processors;
a networking interface, coupled with the one or more processors, to couple the apparatus, as a member of a collection of remote computing resources, to a client computing device, through a network; and
a remote side of an application to be operated by the one or more processors to:
create copies of a graphics context of the application, created by a client side of the application on the client computing device, wherein the graphics context include a plurality of rendering resources associated with generation of display frames of the application, wherein the rendering resources have corresponding identifiers assigned by the client side of the application;
receive from the client side of the application, packed graphics calls in association with generation of a plurality, but not all, of display frames of the application; and
unpack and process the graphics calls to generate the plurality of display frames;
wherein the client side of the application is to include a wrapper to intercept graphic calls and associated data in association with generation of the display frames, and amend non-rendering resource creation ones of the graphics calls to selectively reference the remote copies of the rendering resources, through usage of the identifiers.

21. The apparatus of claim 20, wherein the remote side of an application is to further pack and send the plurality of display frames to the client side of the application for unpacking, and rendering onto a display unit of the client computing device.

22. A method for operating an application, comprising:
creating on a collection of computing resources remote to a client computing device, by a remote side of the application operating on the collection of computing resources, copies of a graphics context of the application, corresponding to the graphics context created by a client side of the application on the client computing device, wherein the graphics context include a plurality of rendering resources associated with generation of display frames of the application;
receiving, by the remote side of the application, from the client side of the application, at least packed graphics calls in association with generation of a plurality, but not all, of display frames of the application; and
unpacking and processing, by the remote side of the application, the graphics calls to generate the plurality of display frames;
wherein the method further includes a wrapper of the client side of the application intercepting graphic calls and associated data in association with generation of the display frames, and amending non-rendering resource creation ones of the graphics calls to selectively reference the remote copies of the rendering resources, through usage of the identifiers.

23. The method of claim 22 further comprising packing and sending, by the remote side of the application, the plurality of display frames to the client side of the application for unpacking, and rendering onto a display unit of the client computing device.

* * * * *